(12) United States Patent
Sohm

(10) Patent No.: US 10,940,918 B2
(45) Date of Patent: Mar. 9, 2021

(54) WATERCRAFT WITH TRANSOM-MOUNTED LIFTING FIN

(71) Applicant: Malcolm Sohm, Sherrills Ford, NC (US)

(72) Inventor: Malcolm Sohm, Sherrills Ford, NC (US)

(*) Notice: Subject to any disclaimer, the term of this patent is extended or adjusted under 35 U.S.C. 154(b) by 0 days.

(21) Appl. No.: 16/661,527

(22) Filed: Oct. 23, 2019

(65) Prior Publication Data

US 2020/0055566 A1 Feb. 20, 2020

Related U.S. Application Data

(62) Division of application No. 15/694,195, filed on Sep. 1, 2017, now Pat. No. 10,486,772.

(51) Int. Cl.
| | |
|---|---|
| B63H 1/14 | (2006.01) |
| B63B 1/00 | (2006.01) |
| B63B 1/24 | (2020.01) |
| B63B 1/26 | (2006.01) |
| B63B 1/32 | (2006.01) |
| B63B 35/34 | (2006.01) |
| B64C 25/54 | (2006.01) |
| B63H 1/18 | (2006.01) |
| B64C 25/32 | (2006.01) |
| B63H 20/00 | (2006.01) |

(52) U.S. Cl.
CPC ............... *B63B 1/32* (2013.01); *B63B 35/34* (2013.01); *B63H 1/18* (2013.01); *B64C 25/54* (2013.01); *B63H 20/00* (2013.01); *B64C 2025/325* (2013.01)

(58) Field of Classification Search
CPC .. B63B 35/34; B63B 1/10; B63B 1/18; B63B 1/20; B63B 1/24; B63B 1/26; B63B 1/32; B63B 2001/10; B63B 2001/18; B63B 2001/186; B63B 2001/20; B63B 2001/204; B63B 2001/205; B63B 2001/206; B63B 2001/24; B64C 25/54; Y02T 70/10
USPC .................. 114/61.1, 292; 440/49
See application file for complete search history.

(56) References Cited

U.S. PATENT DOCUMENTS

| | | |
|---|---|---|
| 2,950,699 A | 8/1960 | Ogden et al. |
| 3,289,226 A | 12/1966 | Thompson |
| 4,870,919 A | 10/1989 | Allison |
| 5,184,561 A | 2/1993 | Nickell |
| 5,540,169 A | 7/1996 | Davis et al. |
| 5,911,187 A | 6/1999 | Sohm |
| 5,988,087 A | 11/1999 | Pepper |
| 6,470,817 B2 | 10/2002 | Delfosse |
| 6,477,969 B2 | 11/2002 | Schell-Tomczak et al. |
| 6,516,736 B1 | 2/2003 | VanLancker |

(Continued)

*Primary Examiner* — Daniel V Venne
(74) *Attorney, Agent, or Firm* — Boyle Fredrickson S.C.

(57) ABSTRACT

A watercraft is provided with fin on its transom. The fin extends outwardly from a portion of the transom that extends into the water. The fin includes a first portion and a second portion positioned rearwardly of the first portion. The second portion is inclined downwardly and rearwardly relative to the first portion and positioned so as to provide lift and to channel water toward the propeller. The watercraft may be a pontoon boat having first and second laterally-spaced pontoons located under the deck on opposite sides of the transom. Additional fins may be mounted on the first and second laterally-spaced pontoons.

14 Claims, 7 Drawing Sheets

(56) References Cited

U.S. PATENT DOCUMENTS

| | | | |
|---|---|---|---|
| 6,644,229 B1 | 11/2003 | Davenport | |
| 7,210,422 B1 | 5/2007 | Hickok et al. | |
| 7,533,622 B1 | 5/2009 | Jaszewski et al. | |
| 7,870,830 B2 | 1/2011 | Bogard et al. | |
| 9,174,703 B2 * | 11/2015 | Sheedy | B63B 32/70 |
| 9,233,732 B2 | 1/2016 | Wilson | |
| 9,446,823 B2 * | 9/2016 | Sheedy | B63B 1/20 |
| 9,475,548 B1 | 10/2016 | Slocum | |
| 9,914,503 B2 * | 3/2018 | Huyge | B63B 39/061 |
| 9,988,126 B2 * | 6/2018 | Wood | B63B 1/22 |
| 10,040,522 B1 * | 8/2018 | Hartman | B63B 34/75 |
| 10,358,189 B2 * | 7/2019 | Sheedy | B63B 1/286 |

\* cited by examiner

WATERCRAFT WITH TRANSOM-MOUNTED LIFTING FIN

CROSS-REFERENCE TO RELATED APPLICATIONS

The present application is a division of U.S. patent application Ser. No. 15/694,195 filed on Sep. 1, 2017 and entitled "Watercraft Lifting Fin" the entire contents of which are hereby expressly incorporated by reference into the present application.

BACKGROUND OF THE INVENTION

1. Field of the Invention

The present invention relates generally to watercraft such as boats, ships, helicopters, and the like, and specifically to buoyant pontoons utilized in such watercrafts and to watercraft having such pontoons.

2. Discussion of the Related Art

Pontoon boats are popular among recreational boating enthusiasts because they provide exceptional stability in the water and are extremely rugged and durable. Typical pontoon boats comprise a hull in the form of a horizontal, rectangular deck supported on two distal, elongated pontoons. These pontoons are made watertight in order to provide a buoyant force allowing the boat to float in the water. Pontoon boats, however, are not the only watercraft to use pontoons as floatation devices. Increasingly, designs employing pontoons are being used in larger craft such as ferries, scientific research vessels and the like where stability of the craft in the water is important.

Although stable, pontoon-type watercraft such as pontoon boats typically have somewhat limited handling and performance characteristics compared to other watercraft such as V-hulled boats. This limited performance may become especially noticeable at higher speeds or in rough water.

Proposals have been made to mount structures on or in the vicinity if pontoons to improve handling and performance. For example, U.S. Pat. No. 5,911,187 to Sohm (the '187 patent) proposed the provision of fins extending laterally away from the inboard and outboard portion of each pontoon's shell. Each fin of this design extends linearly and parallel with centerline of the pontoon along the entire length of the pontoon. Since the typical pontoon has a tapered or frustoconical at its bow end, each fin is inclined upwardly and forwardly along is bow end, whereas the remainder of the fin extends parallel to the deck of the boat. The fins were thought to improve performance of the pontoon by channeling water away from the pontoon's shell and allowing air to move under the deck of the pontoon boat, increasing lift and providing a smoother ride at higher speeds or in rough water and also giving the pontoon boat improved handling characteristics.

However, the inventor has discovered that the effectiveness of fins of the type disclosed in the '187 patent is reduced for modern pontoon boats that are heavier than in the past, carry heavier loads, and are powered by larger, heavier, and more powerful motors. Modern motors used on pontoon boats typically have horsepower ratings of 115 to 350 Hp or even higher and weigh from 300 lbs. to 1000 lbs. or even more. The total weight borne by the pontoons is further increased by larger fuel tanks typically used for these motors. Some of these motors generate so much torque that their propellers are subject to cavitation at startup or under other high-acceleration conditions. This cavitation dramatically reduces propeller effectiveness and also reduces stability and handling.

In addition, the inventor has discovered that the rear or stern end portion of the prior fins provides inadequate lift on heavily-loaded boats to achieve the desired benefits of smooth ride and improved handling.

Other attempts to improve lift during operation of a pontoon include the provision of lifting strakes or simply "strakes" on at least the inboard surface of each pontoon. These strakes take the form of wedge-shaped plates or channels that are provided at least near the bow section of each pontoon and that are designed prevent the bow of the boat from plowing into the water and to channel water sternwardly. Such devices, sometimes also referred to as fins, are described, for example, in U.S. Pat. No. 5,184,561. However, these strakes, like the fins discussed above, do not provide enough lift at the stern portion of the boat and are ineffective at preventing cavitation. They are also subject to contamination by algae, zebra mussels, etc.

Consequently, it is desirable to provide an improved watercraft such as pontoon boat (or a ship or even an aircraft such as a helicopter employing a pontoon-based design) which provides improved handling and increased performance at higher speeds or in rough water that was the case with prior fins by improving lift and/or reducing cavitation when compared to prior art strakes or fins.

SUMMARY OF THE INVENTION

In accordance with a first aspect of the invention, a watercraft is provided having a hull and an outboard motor. The hull has a deck, a bow, and stern, and a transom located beneath the deck and between the bow and the stern. The outboard motor is operatively supported on the hull, the outboard motor having a propeller. A fin extends outwardly from a portion of the transom that extends into the water. The fin includes a first portion and a second portion positioned rearwardly of the first portion. The second portion is inclined downwardly and rearwardly relative to the first portion and positioned so as to provide lift and to channel water toward the propeller.

The fin on the transom may be inclined downwardly and rearwardly at an angle of between 5 degrees and 15 degrees relative to a horizontally-extending centerline of the transom.

The fin on the transom may extend horizontally away from the transom and include a lip extending downwardly from an end of each fin that is remote from the transom.

The watercraft may be a pontoon boat having first and second laterally-spaced pontoons located under the deck on opposite sides of the transom. Additional fins may be mounted on the first and second laterally-spaced pontoons. Each of the additional fins includes a first portion and a second portion positioned rearwardly of the first portion, the second portion being inclined downwardly and rearwardly relative to the first portion and positioned so as to provide lift and to channel water toward the propeller.

The fin on the transom may extends outwardly from an outer surface of the transom with the first portion of the fin extending at least generally parallel with or coincident with a horizontally-extending centerline of the transom.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which:

FIG. 2 is a sectional side elevational view of the pontoon boat shown in

FIG. 1;

DETAILED DESCRIPTION

While the invention is described herein in connection with specific embodiment(s), it will be understood it is not intended to limit the invention to these embodiment(s). On the contrary, it is intended to cover all alternatives, modifications and equivalents as may be included within the spirit and scope of the invention as defined by the appended claims. For example, while the specific pontoon embodiment depicted in most of the drawings is shown and described in connection with a pontoon boat having two pontoons, this pontoon and variations of it and the fins falling within the scope of the present invention could be used on larger and smaller watercraft having more or less than two pontoons, and even on aircraft such as helicopters.

Figure 1:
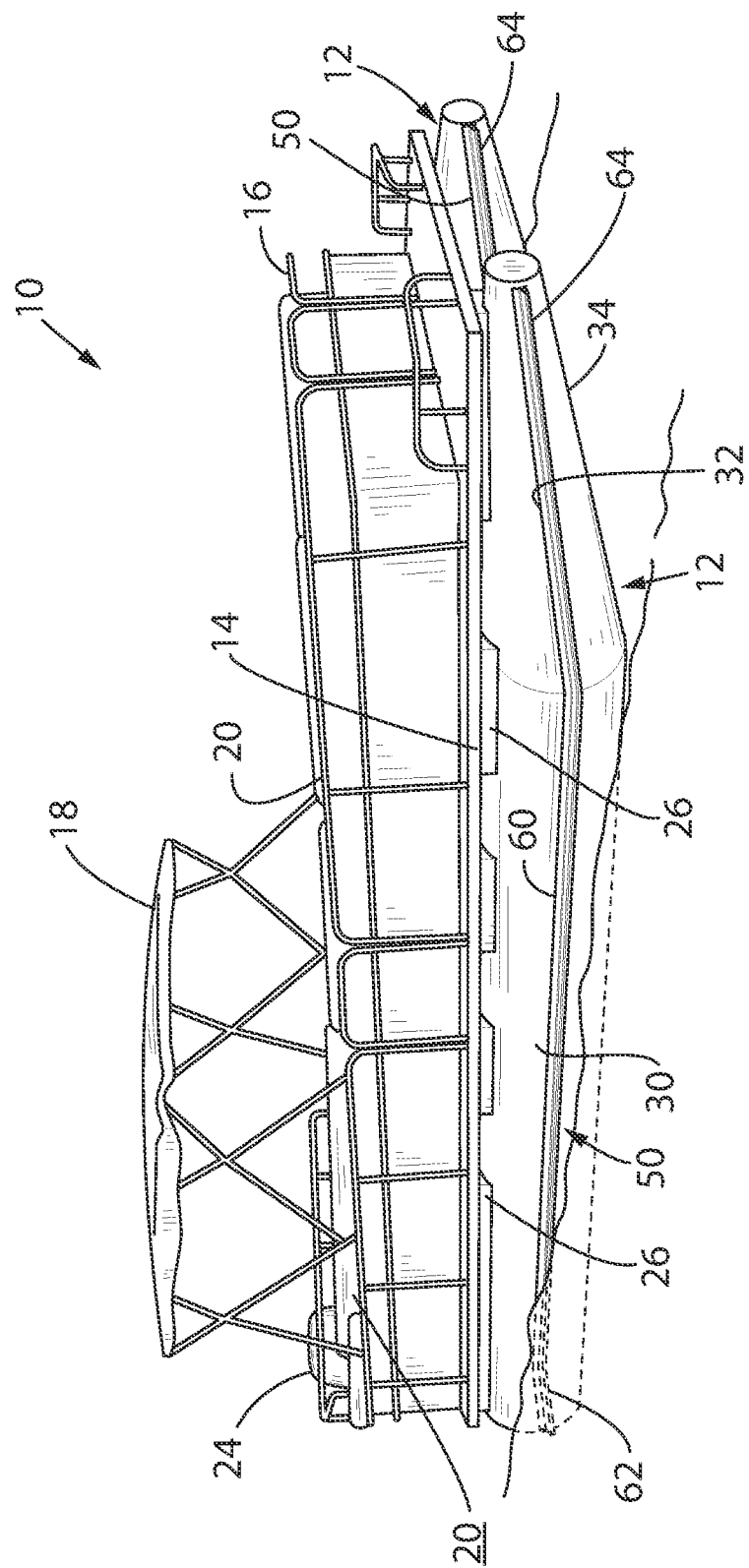
FIG. 1 is an isometric view of a watercraft in the form of a pontoon boat employing transom-mounted fins according to an exemplary embodiment of the present invention.

FIG. 1 illustrates a pontoon boat 10 employing pontoons 12 fitted with fins according to a preferred embodiment of the present invention. As depicted in FIG. 1, the pontoon boat 10 comprises hull which, as is typical of boats of this type, takes the form of a generally horizontal, rectangular deck 14 disposed over spaced, watertight pontoons 12. The deck 14 may be made of aluminum plate, marine plywood, or the like disposed on a frame (not shown). Standard deck widths range from 8' to 10', and standard deck lengths range from, 20' to 40'. Of course, pontoons as discussed herein are usable with both larger and smaller decks than these standard-sized decks. It is anticipated that typical pontoon boat accessories such as deck railing 16, a canopy 18, seats 20 and the like may be secured to the deck 14 to provide a comfortable environment to the pontoon boat's passengers. Similarly, provisions may be made for controls and an outboard motor 24 (see FIGS. 2-5). The deck 14 may be secured to the pontoons 12 by attachments 26 comprising box-like brackets or the like. These attachments 26, typically made of aluminum, may be welded to the upper surfaces of the pontoons 12 and bolted to the deck 14, thus securing the deck 14 to the pontoon 12.

Figure 2:
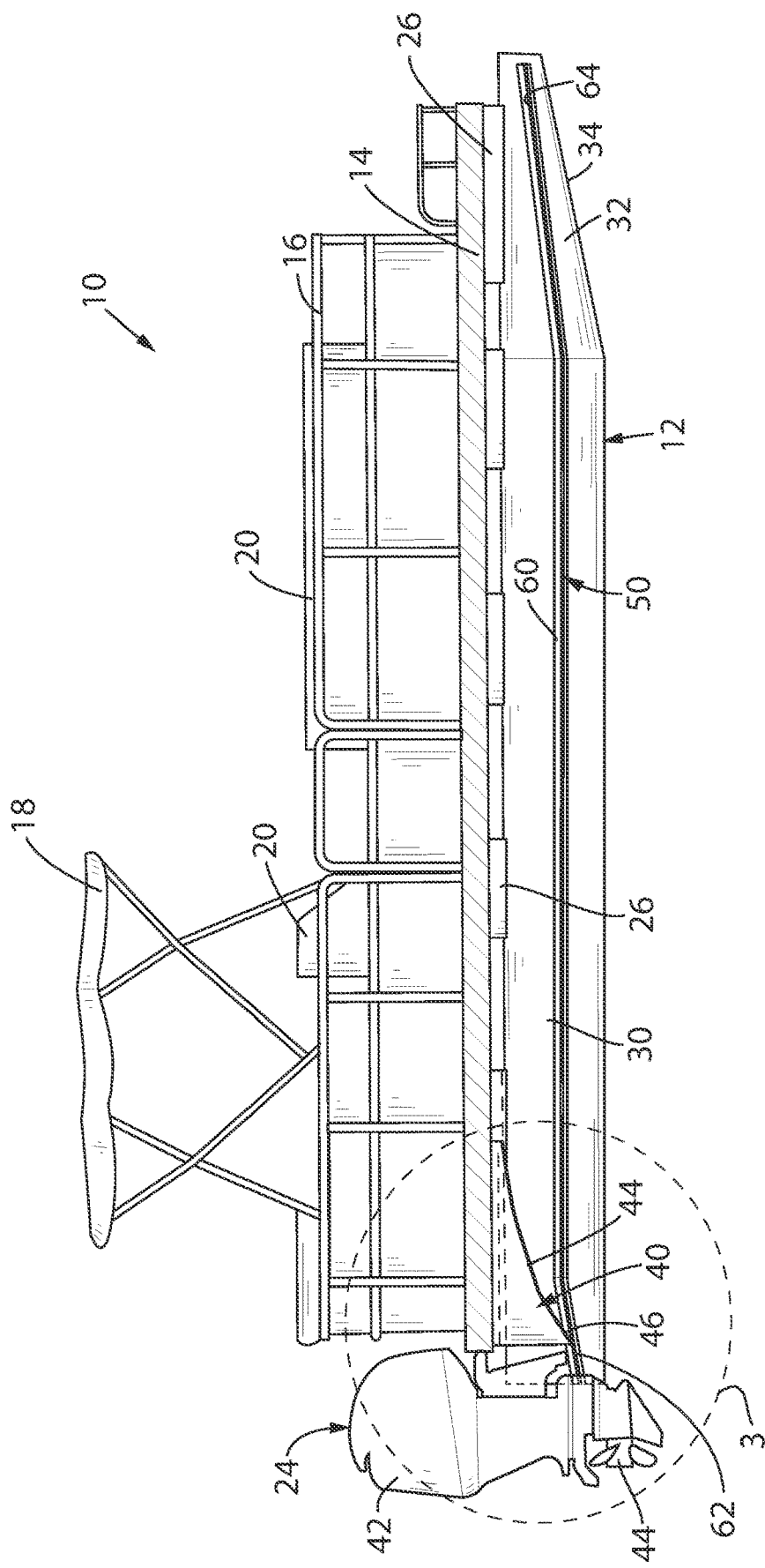
Figure 4:
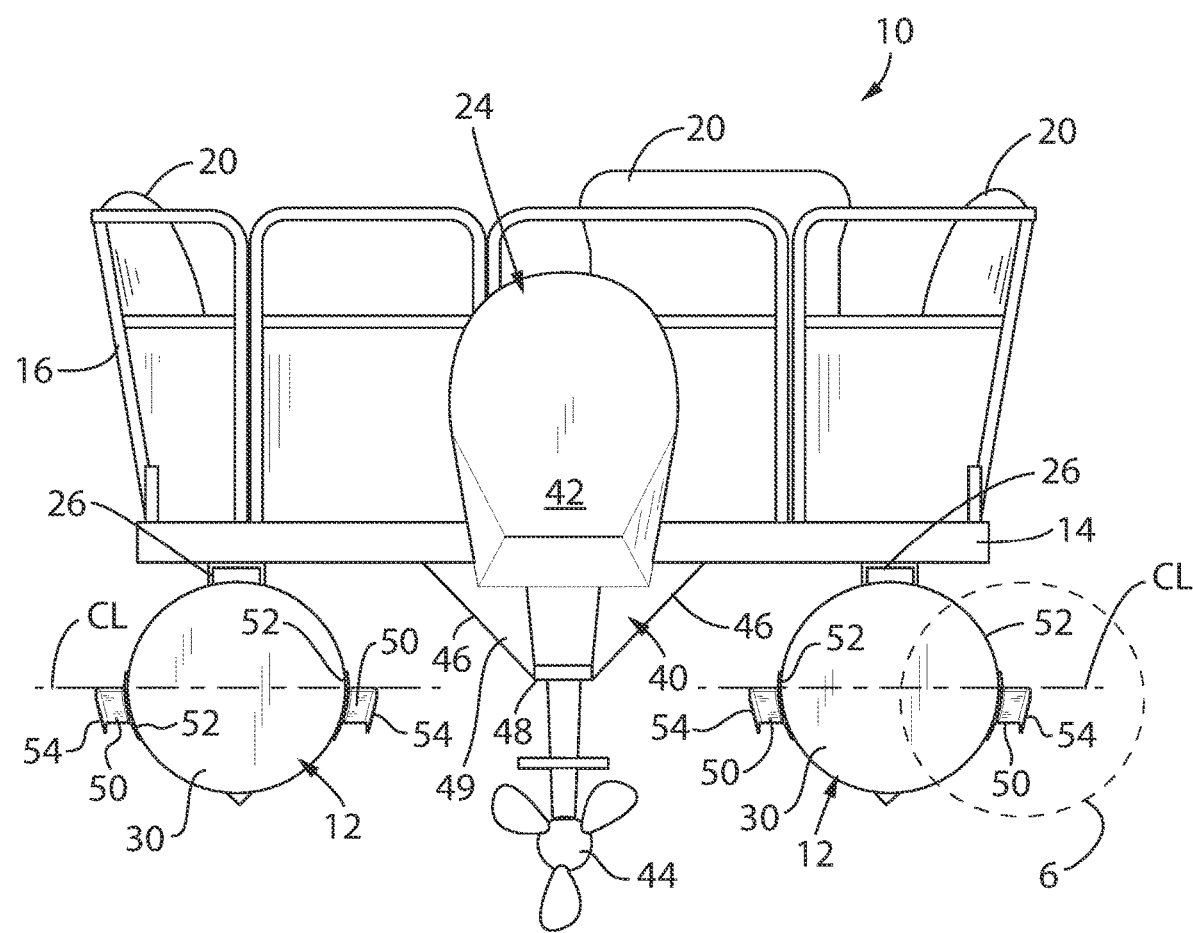
FIG. 4 is a rear end elevation view of the boat of FIGS. 1-3.
Figure 6:
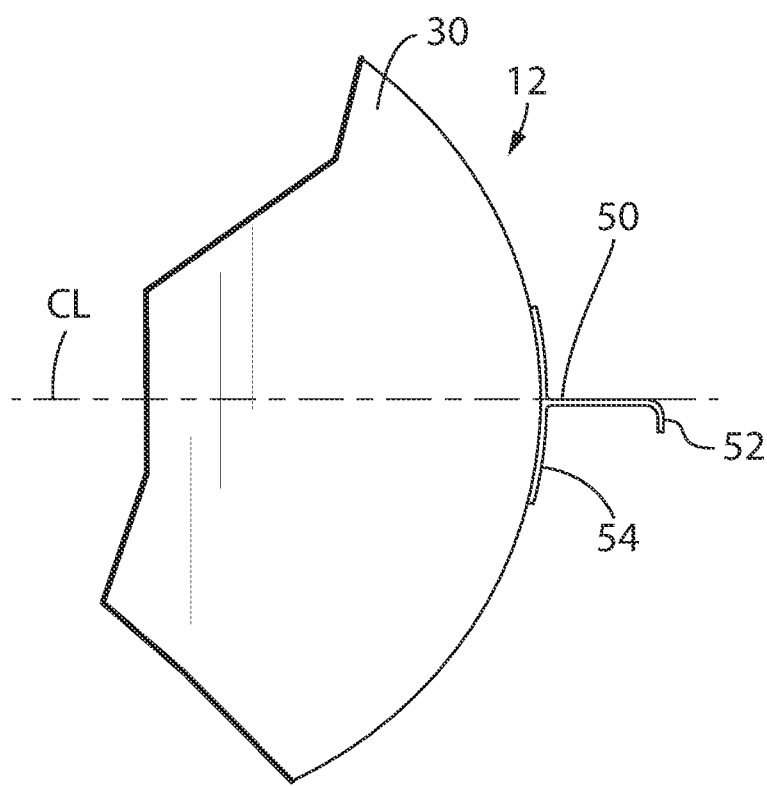
FIG. 6 is a rear end elevation view of one of the fins of a pontoon of the boat of FIGS. 1-4, mounted on the associated pontoon.

Referring now to FIGS. 1 and 2, each pontoon 12 extends longitudinally of the deck 14 and comprises a cylindrical rear barrel portion 30, sometimes referred to as a "log", and a front portion 32 that is tapered in an eccentric fashion, such as being generally frustoconical in shape in the illustrated embodiment. Each pontoon 12 typically is generally the same length as the deck 14, plus or minus one-to-two feet at each end of the deck. Standard pontoon diameters for pontoon boats range from 24" to 36" though smaller and larger pontoons than these are certainly contemplated. The front portion 32 of each pontoon 12 may have a lower surface 34 extending upward at an angle out of the water. Referring to FIGS. 4 and 6, each pontoon 12 has a midline or lateral centerline CL. This midline CL extends horizontally or in parallel with the deck 14 along the length of the barrel portion 30 of each pontoon 12 and is inclined upwardly along the front, tapered portion 32 at an angle that is dependent on the geometry of the tapered front portion 32.

It should be noted that terms such as "horizontal" and "vertical" as used herein refer to orientations when the boat 10 is sitting on a solid horizontal surface and do not take into account the fact that the typical boat will not float levelly in the water. The stern portion instead typically is lower than the bow portion when the boat 10 is floating, especially when the boat is accelerating. Hence, the waterline is inclined relatively to the horizontal due to an uneven weight distribution along the length of the boat 10. The angle of repose also is variable depending on, amongst other factors, acceleration.

The outer surface of each pontoon 12 is formed from a shell made of aluminum or the like. This shell preferably is watertight to provide sufficient buoyant force to allow the pontoon boat 10 to remain afloat. A buoyant material (not shown) may be enclosed within the shell to allow the pontoon 12 to float should it become damaged or punctured.

Figure 3:
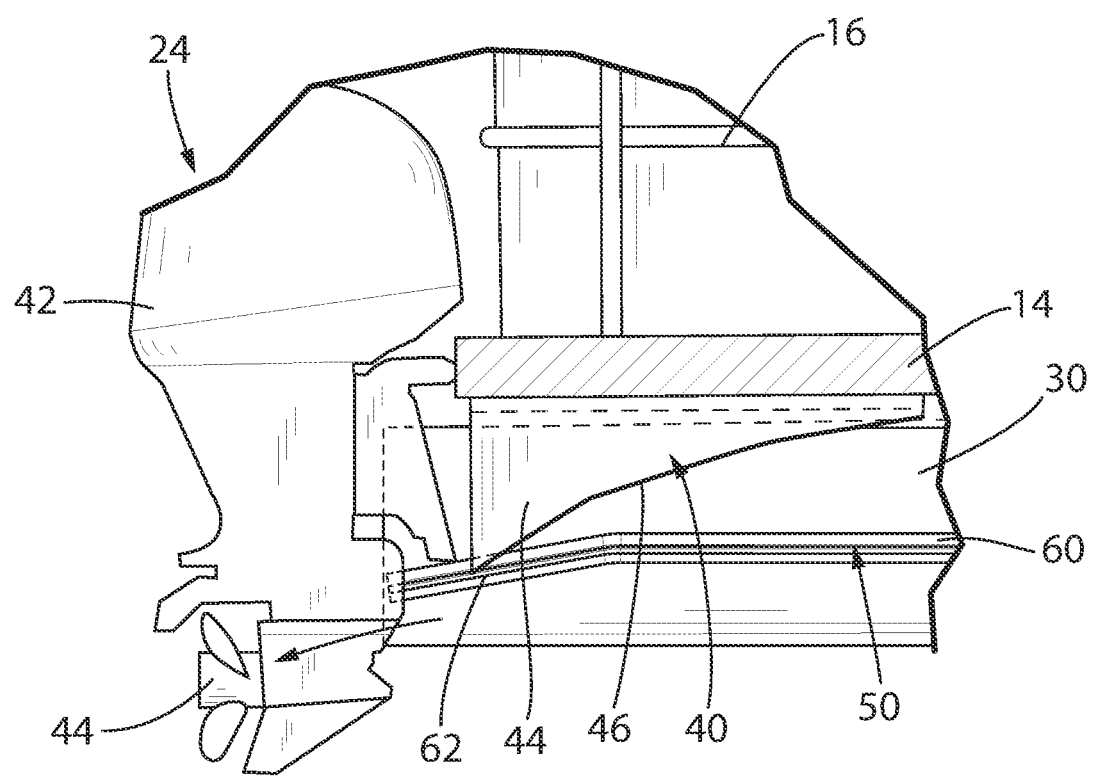
FIG. 3 is a fragmentary sectional side elevation view of the portion of the boat shown encircled in FIG. 2.

FIGS. 2-4 also depict the outboard motor 24 and a motor transom 40 on which the motor 24 is mounted. The motor 24 includes an engine 42 that drives a propeller 44. The motor 24 is relatively large and powerful when compared to those used on pontoon boats of similar sizes in the past. Motors rated at 115 to 300 Hp or even more are contemplated. Such motors may weight in excess of 350 lbs. and even in excess of 1000 lbs.

The motor transom 40 functions to deflect waves as well as the wake and spray created by the pontoons 12 away from the motor 24, thus providing a smoother ride in rough water and at high speeds. This motor transom 40 may be affixed to the bottom surface of the deck 14 and preferably comprises an aluminum trough having generally triangular side walls 46 extending downward from the deck 14 to a bottom wall 48. A rear wall 49 extends between the triangular side walls 46 and bottom 48 wall. This rear wall 49 provides an attachment for the outboard motor 24. The motor transom 40 extends from the middle of the deck 14, where the transom 40 is flush with the deck's bottom surface, to the rear edge of the deck 14. As discussed below, fins (not shown) could be mounted on the sidewalls 46 of the transom 40.

Figure 5:
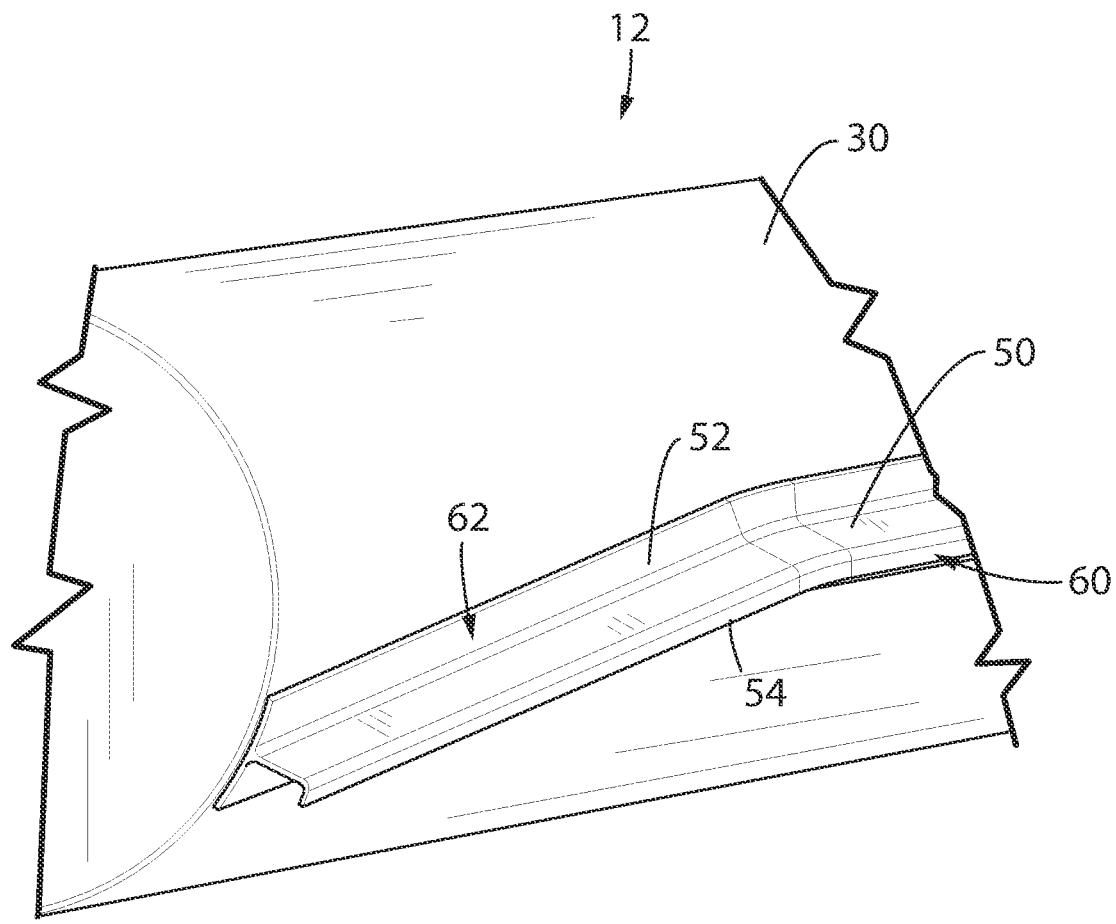
FIG. 5 is a fragmentary isometric view taken from behind one of the pontoons of the boat of FIGS. 1-4.

As shown in FIG. 1-6, fins 50 extend laterally away from the inboard and outboard sides of each pontoon 12 and extend along the majority or, more typically, most of even the entire length of the pontoon 12. Each of the four fins 50 may be made of extruded aluminum. Each fin 50 may be formed integrally with a curved mount 52 and an outer lip 54. Referring momentarily to FIGS. 5 and 6, each fin 50 extends horizontally away from the mount 52 to a distal end. The associated lip 54 extends downwardly from the distal end of the fin 50. This lip 54 acts to maintain water flow under the fin 50 rather than spraying outwardly away from the fin 50. It also helps direct water flowing past the rear end of the fin 50 toward the propeller 44 rather than spraying out away from the propeller 44, further reducing cavitation.

The mount 52 for each fin 50 is welded to the aluminum shell of the associated pontoon 12 and supports an inner end of the fin 50. The mount 52 is curved at a radius matching that of the portion of the pontoon shell on which it is mounted. Mount 52 should be high enough to provide a sufficiently large mounting area to withstand the forces imposed on it during rigorous operation, including hard turns and rapid acceleration in rough water. The mount 52 of this particular embodiment is about 6" high, with the fin 50 extending outwardly from the vertical midpoint of the mount 52.

The lip 54 may be joined to the fin 50 at a radius as shown or at a sharp corner, and may extend perpendicularly from the fin 50 as shown or at a negative or positive acute angle of 0 to 30 degrees or even more. The fin 50 of this embodiment has thickness of about ⅜". As measured from the outer surface of the mounting portion to the radius, the fin is about 2½" long. As measured from the radius to its bottom end, the lip is about ¾" long. All of these dimensions are merely exemplary.

Each fin 50 can be conceptually divided into first, second, and third longitudinally extending portions 60, 62, and 64. The first and second portions 60 and 62 extend along the barrel 30 from the front end of the barrel 30 to the rear end, and the third portion 64 extends forwardly from the first portion 60 along the front portion 32 of the pontoon 12. The first portion 60 of each fin 50 could be located at or near the lateral centerline CL of the pontoon 12 so as to be parallel to or even coincident with the lateral centerline CL. It extends the majority of the length of the barrel 30, and more typically between 65% and 80% of the length of the barrel 30.

The second, or rear end portion 62 of each fin 50 is inclined rearwardly and downwardly from the rear end of the first portion 60 toward and typically to the rear or stern end of the pontoon 12. The angle of this incline and the length of the inclined portion 62 are set to 1) provide increased lift to accommodate the weight of the relatively heavy outboard motor 24 and passengers while still providing the desired handling and stability and 2) channel water flowing along the fin 50 toward the propeller 44, inhibiting or preventing cavitation. The inclined rear portion 62 of the illustrated fin 50 extends at an angle of 14.5 degrees relative to lateral centerline of the barrel 30 and extends 24". As such, the rear end of the inclined portion 62 of the fin 50 is positioned about 6" beneath the front end thereof.

It should be noted that the rear end portion 62 of the fin 50 need not extend linearly along its entire length, so long as it provides the desired effects of increasing lift and channeling water toward the propeller 44. Even with a linearly-extending fin rear end portion 62, angles of slightly more than 14.5 degrees or considerably less 14.5 degrees relative to the lateral centerline CL of the barrel 30 could be employed, though the desired lifting effect drops sharply at angles beyond 15 degrees and the desired lift and cavitation prevention effects both diminish progressively at angles below 14.5 degrees. As such, angles of 5 degrees to 14.5 degrees are typical, and angles of 10 degrees to 14.5 degrees are more typical.

The third, or front end portion 64 of each fin 50 extends along the lateral centerline CL of the tapered front portion 32 of the pontoon 12. It thus extends upwardly at an inclined angle from the front end of the first portion 60 of the fin 50 to the front end of the pontoon 12.

Figure 7:
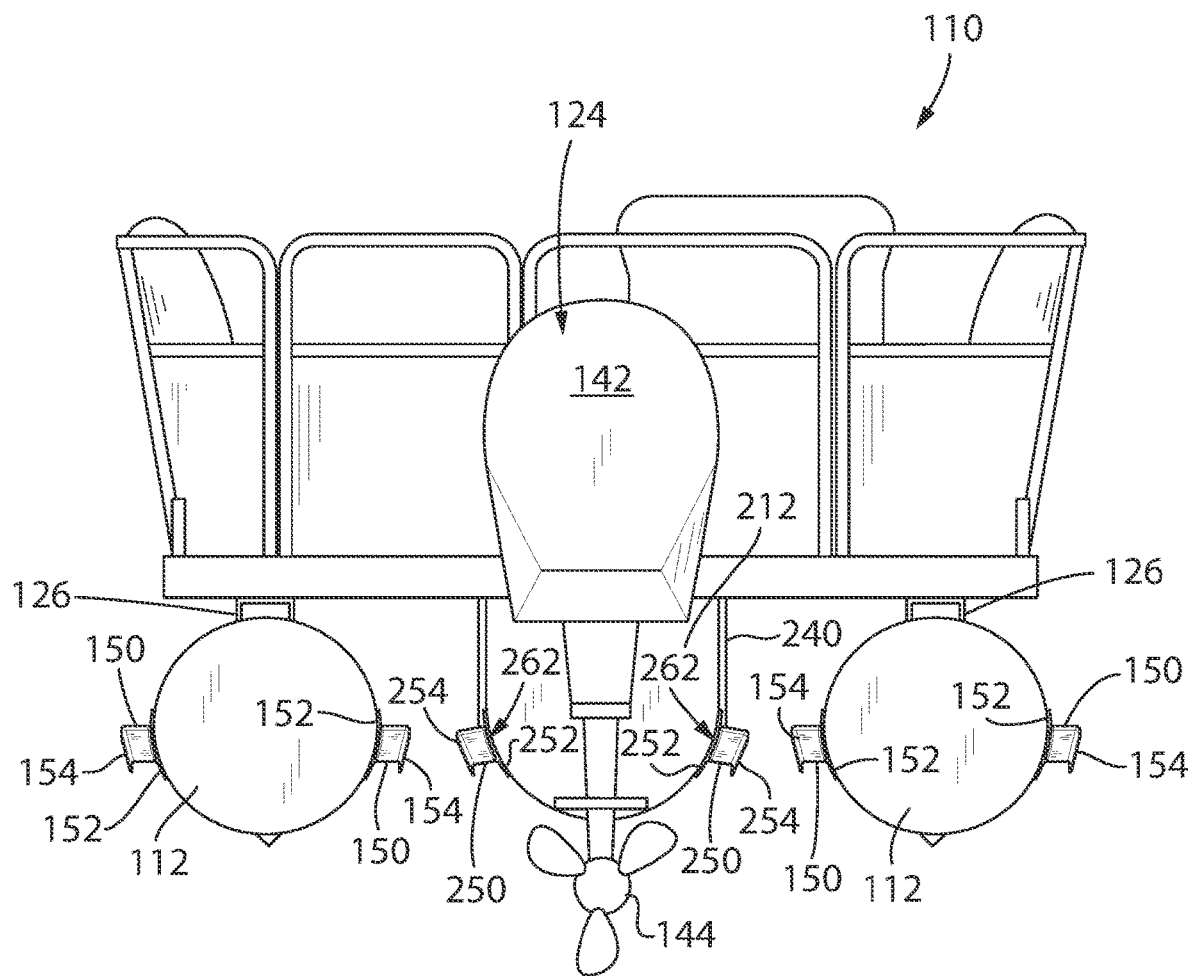
FIG. 7 generally corresponds to FIG. 4 but depicts an embodiment in which fins are mounted on a transom on a center pontoon of the boat.

As applied to a watercraft, at least some of the benefits of the fins could be achieved if the fins were mounted on the transom or other water-engaging structures on the boat instead of or in addition to the pontoons. Referring to FIG. 7, such fins 250 are illustrated as being mounted at least in part on a transom 240 of a watercraft 110 powered by a motor 124. The transom 240 is mounted on or integrated with a center pontoon 212 of the boat 110. The center pontoon 212 is located mid-way between side pontoons 112. Side pontoons 112 are configured as described above in conjunction with the first embodiment. They are attached to the deck 114 by attachments 126 and are fitted with fins 150, mounts 152, and lips 154—also as described above.

Each transom fin 250 includes a front, horizontal portion (not shown) corresponding to the first, central portion of the fin 50 of the first embodiment and a second, rear portion 262. The first portion extends horizontally, and the second portion 262 extends downwardly and rearwardly from the first portion 260 as described above in conjunction with the first embodiment. Each fin 250 may be accompanied by a mount 252 and a lip 254, also as in the first embodiment. In the illustrated embodiment in which the transom 240 is provided on a pontoon 212, each fin 250 extends forwardly of the front of the transom 240 and may include an upwardly inclined front portion (not shown) corresponding to the third portion 64 of the fin 50 as described above. Being located more directly in front of the motor 124 than the fins 150 associated with the pontoons 112, the fins 250 are especially effective at reducing motor cavitation.

In boats lacking a center pontoon or in which the transom is spaced from the pontoon, transom fins could still be mounted on the opposed sides of the transom but likely would include only the first and second portions.

Many other changes and modifications could be made to the invention without departing from the spirit thereof. The scope of these and other changes will become apparent from the appended claims.

I claim:

1. A watercraft comprising:
   (A) a hull having a deck, a bow, and stern, and a transom located beneath the deck and between the bow and the stern;
   (B) an outboard motor operatively supported on the hull, the outboard motor having a propeller; and
   (C) a fin extending outwardly from a portion of the transom that extends into the water, the fin including a first portion and a second portion positioned rearwardly of the first portion, the second portion being inclined downwardly and rearwardly relative to the first portion and positioned so as to provide lift and to channel water toward the propeller, wherein
      the watercraft is a pontoon boat, and further comprising first and second laterally-spaced pontoons located under the deck on opposite sides of the transom.

2. The watercraft according to claim 1, wherein the transom is mounted on or integrated with a center pontoon, the center pontoon being located mid-way between the first and second laterally-spaced pontoons.

3. The watercraft according to claim 1, further comprising additional fins on the first and second laterally-spaced pontoons, each of the additional fins including a first portion and a second portion positioned rearwardly of the first portion, the second portion being inclined downwardly and rearwardly relative to the first portion and positioned so as to provide lift and to channel water toward the propeller.

4. The watercraft according to claim 1, wherein the fin on the transom extends along at least substantially an entire length of the transom.

5. The watercraft according to claim 1, wherein the fin on the transom is inclined downwardly and rearwardly at an angle of between 5 degrees and 15 degrees relative to a horizontally-extending centerline of the transom.

6. The watercraft according to claim 1, wherein the fin on the transom comprises a first fin located on a first side surface of the transom, and further comprising a second fin located on a second side surface of the transom opposite the first side.

7. The watercraft according to claim 1, wherein the fin on the transom extends horizontally away from the transom, and further comprising a lip extending downwardly from an end of the fin that is remote from the transom.

8. The watercraft according to claim 1, wherein the fin on the transom extends outwardly from an outer surface of the transom, the first portion of the fin extending at least generally parallel with or coincident with a horizontally-extending centerline of the transom.

9. The watercraft according to claim 1, wherein the outboard motor has a horsepower rating in excess of 115 Hp and weighs in excess of 300 lbs.

10. A pontoon boat comprising:
   (A) a hull having a deck, a bow, and stern, and a transom located beneath the deck and between the bow and the stern;
   (B) an outboard motor operatively attached to the transom, the outboard motor having a horsepower rating in excess of 115 Hp and weighing in excess of 300 lbs.;
   (C) at least two-laterally spaced pontoons extending at least substantially a majority of an entire length of the hull and supporting the hull and the outboard motor on water; and
   (D) first and second fins extending outwardly from outboard surfaces of the transom, each fin including a linear first portion extending along a line extending at least generally parallel with or coincident with a horizontally-extending centerline of the transom, and a linear second portion positioned rearwardly of the first portion and being inclined downwardly and rearwardly relative to the first portion at an acute angle.

11. The pontoon boat according to claim 10, wherein each fin on the transom extends horizontally away from the transom, and further comprising a lip extending downwardly from an end of each fin that is remote from the transom.

12. The pontoon boat according to claim 10, wherein each fin on the transom is made of extruded aluminum and supported on a mount that is welded to the transom.

13. The pontoon boat according to claim 10, wherein the linear second portion of each of the first and second fins on the transom is positioned so as to provide lift and to channel water toward the propeller.

14. The pontoon boat according to claim 10, further comprising additional fins on the first and second laterally spaced pontoons, each of the additional fins including a first linear portion and a second linear portion positioned rearwardly of the first portion, the second portion being inclined downwardly and rearwardly relative to the second portion and positioned so as to provide lift and to channel water toward the propeller.

* * * * *